United States Patent
Yang et al.

(10) Patent No.: US 12,476,691 B2
(45) Date of Patent: Nov. 18, 2025

(54) STANDARD FOR RECEPTION OF A UE

(71) Applicant: LG ELECTRONICS INC., Seoul (KR)

(72) Inventors: Yoonoh Yang, Seoul (KR); Byeongyong Park, Seoul (KR); Markus Pettersson, Seoul (KR); Ilnam Cho, Seoul (KR); Sangwook Lee, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 17/979,561

(22) Filed: Nov. 2, 2022

(65) Prior Publication Data

US 2023/0224016 A1    Jul. 13, 2023

Related U.S. Application Data

(60) Provisional application No. 63/297,807, filed on Jan. 10, 2022.

(51) Int. Cl.
*H04B 7/08*  (2006.01)
*H04W 72/0453*  (2023.01)

(52) U.S. Cl.
CPC ........ *H04B 7/086* (2013.01); *H04W 72/0453* (2013.01)

(58) Field of Classification Search
CPC ............ H04W 72/0453; H04B 7/086
USPC ...................................... 375/347
See application file for complete search history.

(56) References Cited

U.S. PATENT DOCUMENTS

2019/0230663 A1   7/2019  Lim
2021/0336707 A1*  10/2021  Chervyakov ...... H04B 17/0085

FOREIGN PATENT DOCUMENTS

| CN | 112640330 A | 4/2021 |
| CN | 113597744 A | 11/2021 |
| CN | 113748622 A | 12/2021 |
| JP | 2020501385 | 1/2020 |
| KR | 10-2014-0031918 A | 3/2014 |
| KR | 10-2016-0105512 A | 9/2016 |
| KR | 10-2020-0088266 A | 7/2020 |
| KR | 10-2021-0053790 A | 5/2021 |
| WO | 21/002678 A1 | 1/2021 |

(Continued)

OTHER PUBLICATIONS

Qualcomm Inc., "60 GHz UE RX and General Requirements," 3GPP TSG-RAN WG4 #101-e, R4-2119105, dated Nov. 2021.

(Continued)

*Primary Examiner* — Leila Malek
(74) *Attorney, Agent, or Firm* — BRYAN CAVE LEIGHTON PAISNER LLP

(57) ABSTRACT

One disclosure of the present specification provides a method for performing communication by a user equipment (UE). The method comprises the steps of: receiving a downlink signal, wherein the downlink signal is received with channel bandwidth of 400 MHz, wherein the downlink signal is received via n263 frequency band, wherein the UE is power class 3 UE, wherein the transceiver is configured to satisfy a Radio Frequency (RF) requirement, wherein the RF requirement includes at least one of REFSENS (Reference Sensitivity) and EIS (Effective Isotropic Sensitivity) spherical coverage.

9 Claims, 8 Drawing Sheets

(56) References Cited

FOREIGN PATENT DOCUMENTS

WO     2021029084     2/2021
WO     21/206475 A1   10/2021

OTHER PUBLICATIONS

3rd Generation Partnership Project; Technical Specification Group Radio Access Network; NR; User Equipment (UE) radio transmission and reception; Part 2: Range 2 Standalone (Release 17), 3GPP TS 38.101-2 V17.6.0 (Jun. 2022).
Notice of Allowance for KR Patent Application No. 10-2022-0136005 dated Oct. 30, 2024.
Apple Inc., "Peak EIS and EIS Spherical Coverage for band n262", R4-2102591, 3GPP RAN WG4 Meeting #98e, Electronic meeting, Jan. 25-Feb. 5, 2021.

* cited by examiner

8TX (1x8)

16TX (2x8)

16TX (4x4)

1 panel 2 panels

FIG. 8

1. receiving downlink signal from a base station

STANDARD FOR RECEPTION OF A UE

CROSS-REFERENCE TO RELATED APPLICATIONS

This application claims the benefit of U.S. Provisional Application No. 63/297,807, filed on Jan. 10, 2022, the contents of which are all hereby incorporated by reference herein in their entirety.

TECHNICAL FIELD

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Among the FR2 (Frequency Range 2: 24250 MHz-71000 MHz, FR2-1: 24250 MHz-52600 MHz, FR2-2: 52600 MHz-71000 MHz) band, the introduction of a handheld UE supporting the FR2-2 band is being discussed in the SPEC. Compared to a UE of the FR2-1 band, the number of array antennas used and the characteristics of the RF element are different, so RF performance standard of the UE should be defined in consideration of this.

RF performance standards for handheld UE supporting FR2-2 band should be defined.

SUMMARY

RF performance standard for handheld UE supporting FR2-2 band is proposed.

The present specification may have various effects.

For example, by proposing a standard specification for a handheld UE supporting the n263 band, communication between the network and the UE can be guaranteed and commercialized.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 8 shows a procedure of a UE according to the disclosure of the present specification.

DETAILED DESCRIPTION

Figure 1:
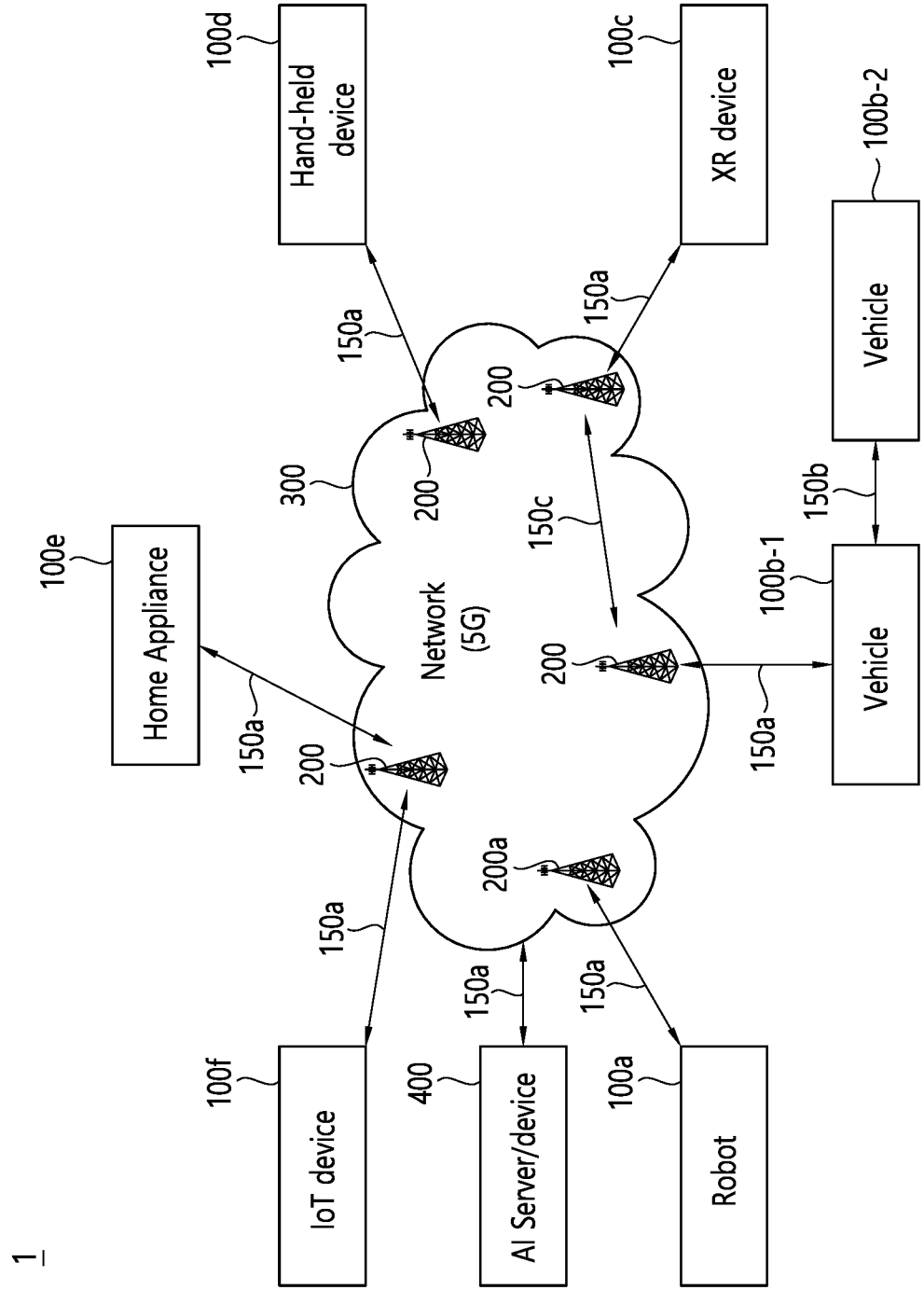
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e g, channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use.

The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
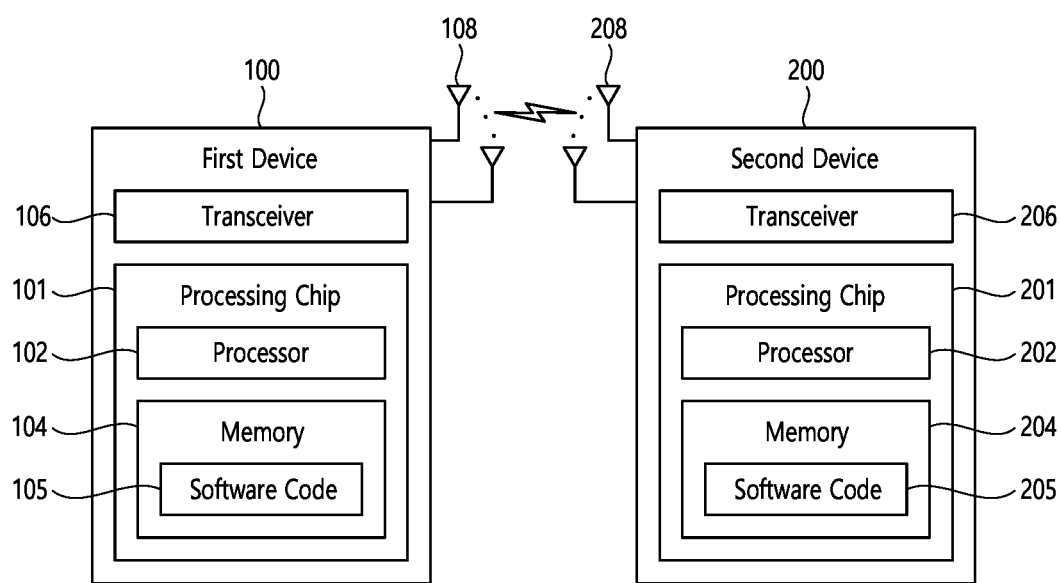
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
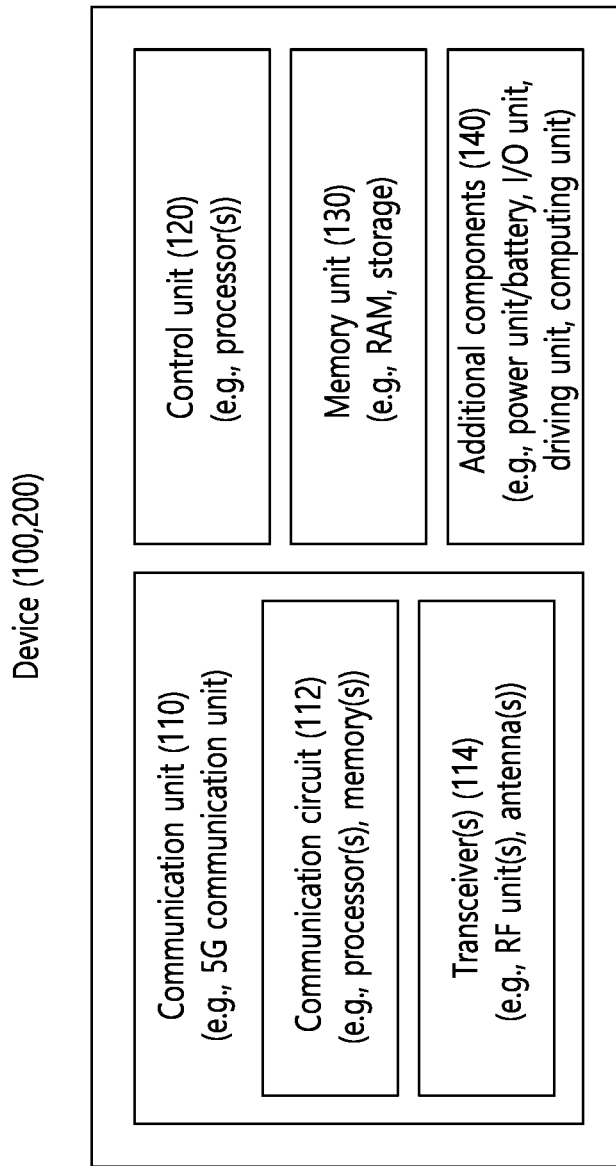
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
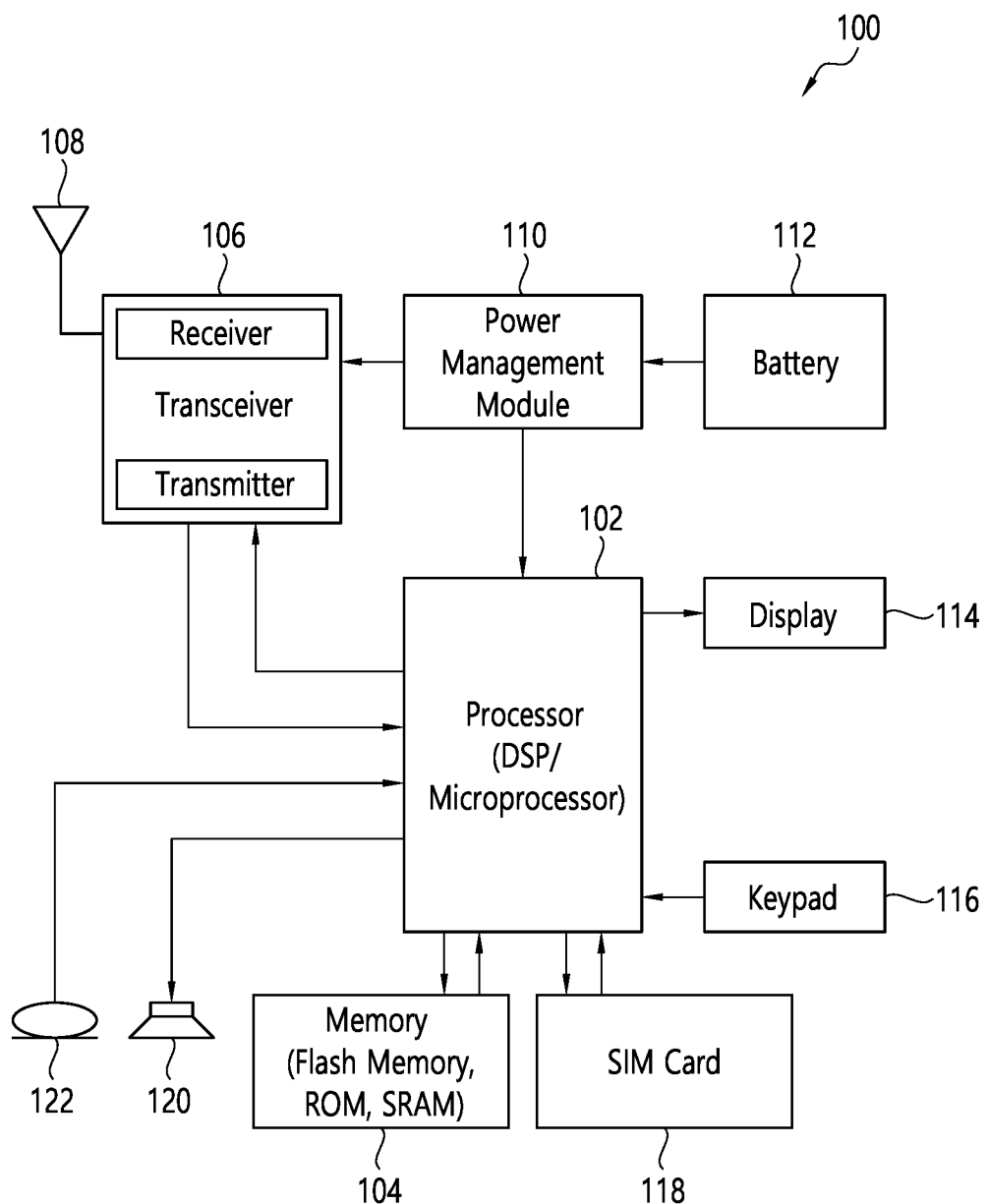
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
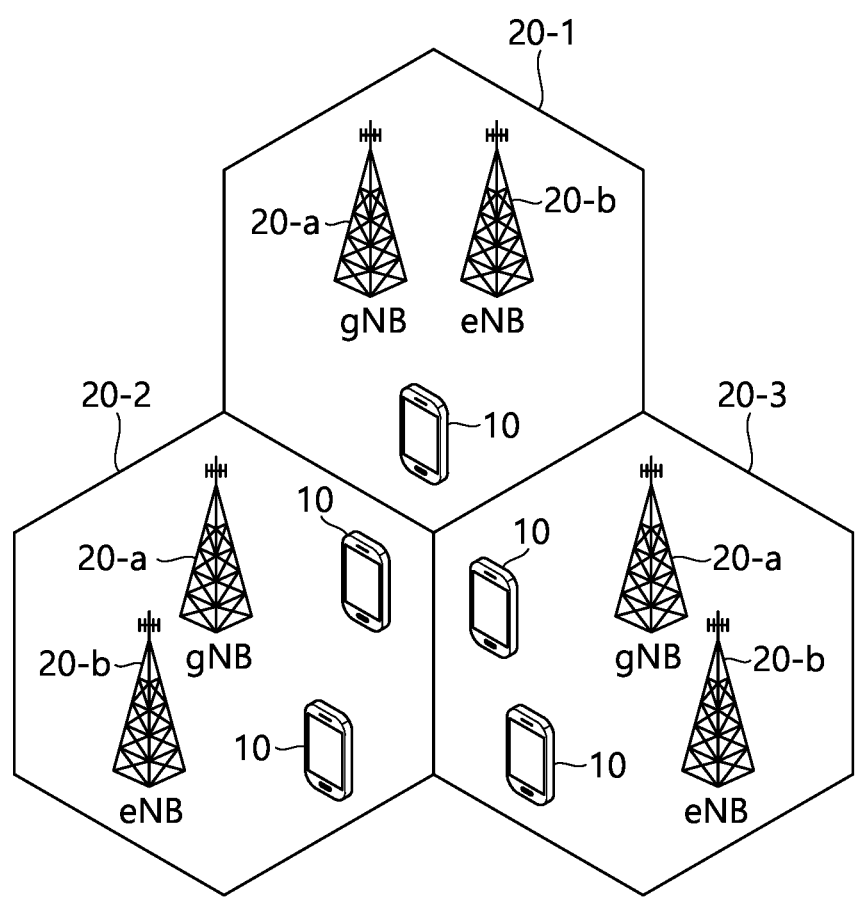
FIG. 5 is a wireless communication system.

FIG. 5 is a wireless communication system.

As can be seen with reference to FIG. 5, the wireless communication system includes at least one base station (BS). The BS is divided into a gNodeB (or gNB) 20a and an eNodeB (or eNB) 20b. The gNB 20a supports 5G mobile communication. The eNB 20b supports 4G mobile communication, that is, long term evolution (LTE).

Each base station 20a and 20b provides a communication service for a specific geographic area (commonly referred to as a cell) (20-1, 20-2, 20-3). A cell may in turn be divided into a plurality of regions (referred to as sectors).

A UE typically belongs to one cell, and the cell to which the UE belongs is called a serving cell. A base station that provides a communication service for a serving cell is called a serving BS. Since the wireless communication system is a cellular system, other cells adjacent to the serving cell exist. Other cell adjacent to the serving cell is referred to as a neighbor cell (or neighboring cell). A base station that provides a communication service to a neighboring cell is referred to as a neighbor BS. The serving cell and the neighboring cell are relatively determined based on the UE.

Hereinafter, downlink means communication from the base station 20 to the UE 10, and uplink means communication from the UE 10 to the base station 20. In the downlink, the transmitter may be a part of the base station 20, and the receiver may be a part of the UE 10. In the uplink, the transmitter may be a part of the UE 10, and the receiver may be a part of the base station 20.

Meanwhile, a wireless communication system may be largely divided into a frequency division duplex (FDD) scheme and a time division duplex (TDD) scheme. According to the FDD scheme, uplink transmission and downlink transmission are performed while occupying different frequency bands. According to the TDD scheme, uplink transmission and downlink transmission are performed at different times while occupying the same frequency band. The channel response of the TDD scheme is substantially reciprocal. This means that the downlink channel response and the uplink channel response are almost the same in a given frequency domain. Accordingly, in the TDD-based wireless communication system, there is an advantage that the downlink channel response can be obtained from the uplink channel response. In the TDD scheme, since uplink transmission and downlink transmission are time-divided in the entire frequency band, downlink transmission by the base station and uplink transmission by the UE cannot be simultaneously performed. In a TDD system in which uplink transmission and downlink transmission are divided in subframe units, uplink transmission and downlink transmission are performed in different subframes.

<Operating Band in NR>

The operating bands in NR are as follows.

The operating band of Table 3 below is an operating band converted from the operating band of LTE/LTE-A. This is called the FR1 band.

TABLE 3

| NR operating band | UL operating band $F_{UL\_low}$-$F_{UL\_high}$ | DL operating band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

The table below shows the NR operating bands defined on the high frequency phase.

This is called the FR2 band.

TABLE 4

| NR operating band | UL operating band $F_{UL\_low}$-$F_{UL\_high}$ | DL operating band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |
| n260 | 37000 MHz-40000 MHz | 37000 MHz-40000 MHz | FDD |
| n261 | 27500 MHz-28350 MHz | 27500 MHz-28350 MHz | FDD |

<Reference Sensitivity>

The reference sensitivity power level REFSENS is defined as the EIS level at the center of the quiet zone in the RX beam peak direction, at which the throughput shall meet or exceed the requirements for the specified reference measurement channel.

1. Reference sensitivity power level (1) Reference sensitivity power level for power class 2

The throughput shall be ≥95% of the maximum throughput of the reference measurement channels. Table 5 shows the peak reference sensitivity. The requirement is verified with the test metric of EIS (Link=RX beam peak direction, Meas=Link Angle).

TABLE 5

| Operating band | REFSENS (dBm)/Channel bandwidth | | | |
|---|---|---|---|---|
| | 50 MHz | 100 MHz | 200 MHz | 400 MHz |
| n257 | −92.0 | −89.0 | −86.0 | −83.0 |
| n258 | −92.0 | −89.0 | −86.0 | −83.0 |
| n261 | −92.0 | −89.0 | −86.0 | −83.0 |
| n262 | −86.8 | −83.8 | −80.8 | −77.8 |

NOTE 1:
The transmitter shall be set to $P_{UMAX}$

The REFSENS requirement shall be met for an uplink transmission using QPSK DFT-s-OFDM waveforms and for uplink transmission bandwidth.

The minimum requirements for reference sensitivity shall be verified with the network signaling value NS_200 configured.

(2) Reference sensitivity power level for power class 3

The throughput shall be ≥95% of the maximum throughput of the reference measurement channels. Table 6 shows the peak reference sensitivity. The requirement is verified with the test metric of EIS (Link=RX beam peak direction, Meas=Link Angle).

For the UEs that support multiple FR2 bands, the minimum requirement for Reference sensitivity in Table 6 shall be increased per band, respectively, by the reference sensitivity relaxation parameter $\Delta MB_{P,n}$. The requirement for the UE which supports a single FR2 band is specified in Table 6. The requirement for the UE which supports multiple FR2 bands is specified in Table 6.

TABLE 6

| Operating band | REFSENS (dBm)/Channel bandwidth | | | |
|---|---|---|---|---|
| | 50 MHz | 100 MHz | 200 MHz | 400 MHz |
| n257 | −88.3 | −85.3 | −82.3 | −79.3 |
| n258 | −88.3 | −85.3 | −82.3 | −79.3 |
| n259 | −84.7 | −81.7 | −78.7 | −75.7 |
| n260 | −85.7 | −82.7 | −79.7 | −76.7 |
| n261 | −88.3 | −85.3 | −82.3 | −79.3 |
| n262 | −82.8 | −79.8 | −76.8 | −73.8 |

NOTE 1:
The transmitter shall be set to $P_{UMAX}$

The REFSENS requirement shall be met for an uplink transmission using QPSK DFT-s-OFDM waveforms and for uplink transmission bandwidth.

The minimum requirements for reference sensitivity shall be verified with the network signaling value NS_200 configured.

2. EIS spherical coverage (1) EIS spherical coverage for power class 2

The maximum EIS at the $60^{th}$ percentile of the CCDF of EIS measured over the full sphere around the UE is defined as the spherical coverage requirement and is found in Table 7 below. The requirement is verified with the test metric of EIS (Link=Spherical coverage grid, Meas=Link angle).

TABLE 7

| Operating band | EIS at $60^{th}$ %-tile CCDF (dBm)/Channel bandwidth | | | |
|---|---|---|---|---|
| | 50 MHz | 100 MHz | 200 MHz | 400 MHz |
| n257 | −81.0 | −78.0 | −75.0 | −72.0 |
| n258 | −81.0 | −78.0 | −75.0 | −72.0 |
| n261 | −81.0 | −78.0 | −75.0 | −72.0 |
| n262 | −74.9 | −71.9 | −68.9 | −65.9 |

NOTE 1:
The transmitter shall be set to $P_{UMAX}$
NOTE 2:
The EIS spherical coverage requirements are verified only under normal thermal conditions The requirement shall be met for an uplink transmission using QPSK DFT-s-OFDM waveforms and for uplink transmission bandwidth.

The minimum requirements for reference sensitivity shall be verified with the network signaling value NS_200 configured.

(2) EIS spherical coverage for power class 3

The maximum EIS at the $50^{th}$ percentile of the CCDF of EIS measured over the full sphere around the UE is defined as the spherical coverage requirement and is found in Table 8 below. The requirement is verified with the test metric of EIS (Link=Spherical coverage grid, Meas=Link angle).

For the UEs that support multiple FR2 bands, the minimum requirement for EIS spherical coverage in Table 8 shall be increased per band, respectively, by the EIS spherical coverage relaxation parameter $\Delta MB_{S,n}$. The requirement for the UE which supports a single FR2 band is specified in Table 8. The requirement for the UE which supports multiple FR2 bands is specified in Table 8.

TABLE 8

| Operating band | EIS at 50th %-tile CCDF (dBm)/Channel bandwidth | | | |
|---|---|---|---|---|
| | 50 MHz | 100 MHz | 200 MHz | 400 MHz |
| n257 | −77.4 | −74.4 | −71.4 | −68.4 |
| n258 | −77.4 | −74.4 | −71.4 | −68.4 |
| n259 | −71.9 | −68.9 | −65.9 | −62.9 |
| n260 | −73.1 | −70.1 | −67.1 | −64.1 |
| n261 | −77.4 | −74.4 | −71.4 | −68.4 |
| n262 | −69.7 | −66.7 | −63.7 | −60.7 |

NOTE 1:
The transmitter shall be set to $P_{UMAX}$
NOTE 2:
The EIS spherical coverage requirements are verified only under normal thermal conditions.

The requirement shall be met for an uplink transmission using QPSK DFT-s-OFDM waveforms and for uplink transmission bandwidth.

The minimum requirements for reference sensitivity shall be verified with the network signaling value NS_200 configured.

REFSENS and EIS spherical coverage at 50%-tile CCDF for n263 is required.

<Disclosures of the Present Specification>

This specification proposes a transmit power requirement of an NR handheld UE operating in FR2-2 (frequency range: 52600 MHz-71000 MHz), which is currently being discussed in the 3GPP Rel-17 standard.

Currently, the frequency range is defined as follows.

TABLE 9

| Frequency range designation | | Corresponding frequency range |
|---|---|---|
| FR1 | | 410 MHz-7125 MHz |
| FR2 | FR2-1 | 24250 MHz-52600 MHz |
| | FR2-2 | 52600 MHz-71000 MHz |

In FR2-2, handheld UE, vehicular UE, FWA, etc. will be used, and RF standards for this are being discussed. RF standards are generally clearly defined in band numbers defined in Frequency Range (FR). In FR2-2, to date, n263 has been defined.

Table 10 shows the operating bands of NR in FR2.

TABLE 10

| NR operating band | Uplink (UL) and Downlink (DL) operating band BS transmit/receive UE transmit/receive $F_{UL\_low}$-$F_{UL\_high}$ $F_{DL\_low}$-$F_{DL\_high}$ | Duplex mode |
|---|---|---|
| n257 | 26500 MHz-29500 MHz | TDD |
| n258 | 24250 MHz-27500 MHz | TDD |
| n259 | 39500 MHz-43500 MHz | TDD |
| n260 | 37000 MHz-40000 MHz | TDD |
| n261 | 27500 MHz-28350 MHz | TDD |
| n262 | 47200 MHz-48200 MHz | TDD |
| n263 (Note) | 57000 MHz-71000 MHz | TDD |

(NOTE):
This band is restricted to operation with shared spectrum channel access The operating band may mean an operating band. The operating band may mean a frequency band in which communication may be performed.

$F_{UL\_low}$ may mean the smallest frequency that can be used for the uplink operating band in each operating band, and $F_{UL\_high}$ may mean the largest frequency that can be used for the uplink operating band in each operating band. $F_{DL\_low}$ may mean the smallest frequency that can be used for the downlink operating band in each operating band, and $F_{DL\_high}$ may mean the largest frequency that can be used for the downlink operating band in each operating band.

Referring to Table 10, FR2-2 may be n263. FR2-2 to be described later may mean the n263 band.

The followings were agreed for FR2-2.

i) Handheld UE antenna array number of elements assumption:
  Commercial FR2-1 antenna module physical dimension can be treated as the feasible FR2-2 antenna module dimension.
  Commercial FR2-1 antenna module is equipped with 1×4 or 2×2 antenna elements.

ii) Vehicular UE antenna array assumption
  Vehicular array size may be equal to or larger than the handheld.

iii) FWA UE antenna array assumption
  If a single power class is defined for FWA in Rel-17, the number of antenna element assumption is anywhere in the range between 32 and 64 elements.

Table 3.3 and Table 3.4 summarize the reference sensitivity and EIS spherical coverage at channel bandwidth (CBW) of 400 MHz which correspond to power class 1, 2, 3, 4 and 5 in FR2-1.

Table 11 may show reference sensitivity and EIS spherical coverage corresponding to power classes 1, 2, 3, 4, and 5 in FR2-1 and having a channel bandwidth (CBW) of 400 MHz.

TABLE 11

| Operating band | Frequency | Reference sensitivity (dBm)/400 MHz | | | | |
|---|---|---|---|---|---|---|
| | | PC1 | PC2 | PC3 | PC4 | PC5 |
| n257 | 28 GHz(26500 MHz-29500 MHz) | −88.5 | −83.0 | −79.3 | −88.0 | −83.6 |
| n258 | 24 GHz(24250 MHz-27500 MHz) | −88.5 | −83.0 | −79.3 | −88.0 | −83.8 |
| n259 | 39 GHz(39500 MHz-43500 MHz) | | | −75.7 | | −80.7 |
| n260 | 39 GHz(37000 MHz-40000 MHz) | −85.5 | | −76.7 | −86.0 | |
| n261 | 28 GHz(27500 MHz-28350 MHz) | −88.5 | −83.0 | −79.3 | −88.0 | |
| n262 | 47 GHz(47200 MHz-48200 MHz) | −83.5 | −77.8 | −73.8 | −82.0 | |

Table 12 shows EIS spherical coverage at CBW of 400 MHz for Power Class 1, 2, 3, 4 and 5 in FR2-1

TABLE 12

| Operating band | EIS at X %-tile CCDF (dBm)/400 MHz | | | | |
|---|---|---|---|---|---|
| | PC1 X = 85 | PC2 X = 60 | PC3 X = 50 | PC4 X = 20 | PC5 X = 85 |
| n257 | −80.5 | −72.0 | −68.4 | −79.0 | −75.6 |
| n258 | −80.5 | −72.0 | −68.4 | −79.0 | −75.8 |
| n259 | | | −62.9 | | −72.7 |
| n260 | −77.5 | | −64.1 | −74.0 | |
| n261 | −80.5 | −72.0 | −68.4 | −79.0 | |
| n262 | −75.3 | −65.9 | −60.7 | −69.9 | |

Table 13 summarize the difference between the minimum peak EIRP and spherical coverage's EIRP which correspond to each X %-tile for power class. The difference is used for EIS spherical coverage requirements.

Table 13 shows the difference between the minimum peak EIRP and spherical coverage's EIRP which correspond to each X %-tile for power class.

TABLE 13

| Operating band | Difference between minimum peak EIRP and EIRP at X %-tile CDF (dB) | | | | |
|---|---|---|---|---|---|
| | PC1 X = 85 | PC2 X = 60 | PC3 X = 50 | PC4 X = 20 | PC5 X = 85 |
| n257 | 8.0 | 11.0 | 10.9 | 9.0 | 8.0 |
| n258 | 8.0 | 11.0 | 10.9 | 9.0 | 8.0 |
| n259 | | | 12.9 | | 8.0 |
| n260 | 8.0 | | 12.9 | 12.0 | |
| n261 | 8.0 | 11.0 | 10.9 | 9.0 | |
| n262 | 8.2 | 11.9 | 13.1 | 12.1 | |

Here, the UE type was assumed for PC1~PC5 in FR2-1 as seen Table 14.

TABLE 14

| UE Power class | UE type |
|---|---|
| 1 | Fixed wireless access (FWA) UE |
| 2 | Vehicular UE |
| 3 | Handheld UE |
| 4 | High power non-handheld UE |
| 5 | Fixed wireless access (FWA) UE |

This specification proposes the requirements of a handheld UE. A handheld UE in the present specification may correspond to a power class 3 UE.

That is, requirements of the power class 3 UE may be proposed in this specification.

Figure 6:
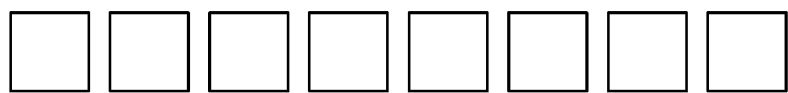
FIG. 6 shows an array antenna module type in FR2-2.
Figure 6:
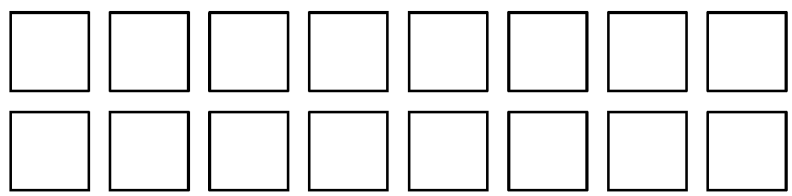
Figure 6:
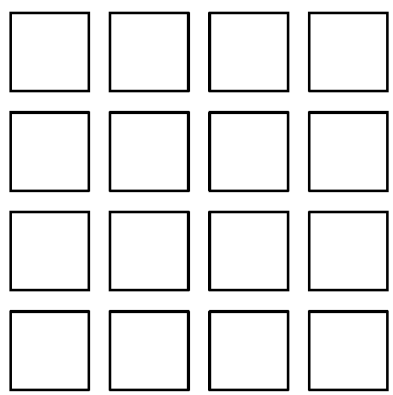

FIG. 6 shows an array antenna module type in FR2-2.

For handheld UE, based on the agreement in WF, 8(8Tx: 1×8) and 16(16Tx:2×8, 4×4) are investigated for number of antenna elements as seen in FIG. 6.

Figure 7:
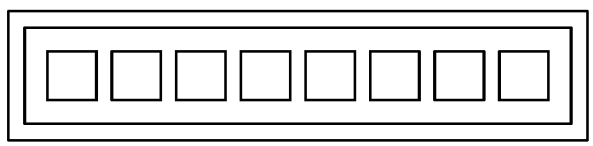
FIG. 7 shows an array antenna module of 1×8 in FR2-2.
Figure 7:

FIG. 7 shows an array antenna module of 1×8 in FR2-2.

1 panel and 2 panels are shown in FIG. 7.

In order to receive the base station DL signal from the handheld UE, a received signal level of SNR=−1 dB relative to a white noise reference may need to be guaranteed. For this, reference sensitivity (=peak Effective Isotropic Sensitivity (EIS) and EIS spherical coverage should be standardized in the very high frequency band. EIS spherical coverage may be defined with different X values for each power class, that is, for each UE type. That is, depending on the UE type, the required spherical coverage may be specified differently.

Case 1. Reference sensitivity

When the number of antenna elements is 8 or 16 and the channel bandwidth is 400 MHz, reference sensitivity may be calculated as shown in Table 15. Here, the antenna roll-off loss with respect to frequency may be assumed to be −2.5 dB in consideration of the wide frequency range of 57000 MHz to 71000 MHz of the n263. Table 15 shows the reference sensitivity of the handheld UE in FR2-2.

TABLE 15

| Parameter | Unit | Value | |
|---|---|---|---|
| Frequency range | GHz | 57~71 | |
| Modulation | | QPSK | |
| SNR requirement | dB | −1 | |
| Bandwidth | MHz | 400 | |
| 10*log10(Max. RX BW), Max. Rx BW = 264 RB@120 kHz | dB | 85.8 | |
| Thermal noise | dBm/Hz | −174 | |
| Noise Figure(NF) | dB | 15 | |
| Number of panel | | 1 or 2 | 1 |
| # of antennas in an array | | 8 | 16 |
| Array gain | dB | 9.0 | 12.04 |
| Average antenna element gain | dBi | 4.6 | 4.6 |

TABLE 15-continued

| Parameter | Unit | Value | |
|---|---|---|---|
| Antenna gain roll-off over frequency | dB | −2.5 | −2.5 |
| Realized antenna array gain | dBi | 11.1 | 14.1 |
| Diversity gain | dB | 0 | 0 |
| Total Implementation loss(ILs) | dB | 10 | 12 |
| REFSENS @ 400 MHz | dBm | −75.3 | −76.3 |

Here, Max. RX BW may be SCS*Maximum_transmission_bandwidth $(N_{RB})$*12. Table 16 shows the maximum transmission bandwidth configuration $N_{RB}$.

TABLE 16

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

Table 17 shows the reference sensitivity for different channel bandwidths based on the reference sensitivity at 400 MHz.

The added value is based on 10*log 10 (other channel bandwidth/400).

Table 17 shows REFSENS of FR2-2 handheld UE.

TABLE 17

| Operating band | Number of antenna elements | REFSENS (dBm)/Channel bandwidth = X dBm/Y MHz | | | | | | | |
|---|---|---|---|---|---|---|---|---|---|
| | | 50 MHz | 100 MHz | 200 MHz | 400 MHz | 800 MHz | 1200 MHz | 1600 MHz | 2000 MHz |
| n263 | 8 | −84.3 | −81.3 | −78.3 | −75.3 | −72.3 | −70.5 | −69.3 | −68.3 |
| | 16 | −85.3 | −82.3 | −79.3 | −76.3 | −73.3 | −71.5 | −70.3 | −69.3 |

Total IM loss may vary depending on the actual implementation method. Therefore, by applying the additional implementation margin delta to the reference sensitivity (X) of Table 17, the reference sensitivity may be determined as follows.

Reference Sensitivity=X (reference sensitivity in Table 17)+delta

Here, the delta may be +/−0.1, +/−0.2, . . . , +/−4.0 dB.

For example, when delta is 3.3 dB, REFSENS may be −72 dBm in n263 band of 400 MHz of channel bandwidth.

Case 2. EIS spherical coverage

For EIS spherical coverage, the difference between EIRP and minimum peak EIRP in 50%-tile cumulative distribution function (CDF) may be reused in FR2-1 as follows.

EIS spherical coverage=reference sensitivity+'the difference between the minimum peak EIRP and EIRP at 50%-tile CDF'

In 8 antenna elements & 16 antenna elements, the difference between EIRP and minimum peak EIRP in 50%-tile CDF may be as shown in Table 18.

Table 18 shows the difference (Z) between EIRP and minimum peak EIRP in 50%-tile CDF of handheld UE.

TABLE 18

Difference(Z) between minimum peak EIRP and EIRP at 50%-tile CDF (dBm)

| Operating band | PC3 | 1 × 8 | | 2 × 8 | | 4 × 4 | |
|---|---|---|---|---|---|---|---|
| | | 1 panel | 2 panels | 1 panel | 2 panels | 1 panel | 2 panels |
| n257 | 10.9 | | | | | | |
| n258 | 10.9 | | | | | | |
| n259 | 12.9 | | | | | | |
| n260 | 12.9 | | | | | | |
| n261 | 10.9 | | | | | | |
| n262 | 13.1 | | | | | | |
| n263 | | 14 + M | 9 + M | | 11.5 + M | | 7.5 + M |

M may be an implementation margin. M may be 0.1, 0.2, . . . , 4.0 dB.

EIS spherical coverage at 50%-tile CCDF may be 'Reference sensitivity (Table 17)+Z (difference in Table 18)'.

For example, when M is 0, EIS spherical coverage at 50%-tile CCDF may be as shown in Table 19.

Table 19 shows EIS spherical coverage in 50%-tile CCDF of handheld UE.

TABLE 19

| Operating band | Number of antenna elements | # of panel | Number of antenna elements | EIS spherical coverage at 50%-tile CCDF (dBm)/Channel bandwidth = X dBm/Y MHz | | | | | | | |
|---|---|---|---|---|---|---|---|---|---|---|---|
| | | | | 50 MHz | 100 MHz | 200 MHz | 400 MHz | 800 MHz | 1200 MHz | 1600 MHz | 2000 MHz |
| n263 | 8 | 1 | 8 (1 × 8) | −70.3 | −67.3 | −64.3 | −61.3 | −58.3 | −56.5 | −55.3 | −54.3 |
| | | 2 | 8 (1 × 8) | −75.3 | −72.3 | −69.3 | −66.3 | −63.3 | −61.5 | −60.3 | −59.3 |
| | 16 | 2 | 16(2 × 8) | −73.8 | −70.8 | −67.8 | −64.8 | −61.8 | −60 | −58.8 | −57.8 |
| | | 2 | 16(4 × 4) | −77.8 | −74.8 | −71.8 | −68.8 | −65.8 | −64 | −62.8 | −61.8 |

Under the assumption of M=0, if Z (difference) values are compared between the number of panels, 1 panel>2 panels may be obtained. In terms of spherical coverage, performance specifications may be suggested based on a two-panel configuration.

In the case of 16 antenna elements, 2×8 in 2 panels may have a Z value 4.0 dB greater than 4×4. In terms of the minimum requirement, performance specifications may be determined with a basic assumption of 2×8.

When M is 1.1 dB, EIS spherical coverage at 50%-tile CCDF in n263 band of power class 3 and a channel bandwidth of 400 MHz may be −60.2 dBm.

In this specification, reference sensitivity and EIS spherical coverage standards are presented based on the array antenna type of the FR2-2 handheld UE. In Case 1, reference sensitivity is proposed, and in Case 2, EIS spherical coverage is proposed. In each case, the presence/absence of a ground plane is also presented. The ground plane may be a flat plate to which an antenna is attached.

When the number of antennas of the handheld terminal increases, the minimum peak EIRP may increase. However, since a heat problem occurs, it is necessary to implement an appropriate number of antennas.

In the case of two panels, the spherical coverage can be improved than that of one panel.

For example, in the case of Pout>0 dBm in FR2-2 handheld UE, reference sensitivity and EIS spherical coverage standards may be proposed assuming 8 antenna elements and 2 panels (8 antenna elements per panel) implementation.

Alternatively, if Pout≤0 dBm in FR2-2 handheld UE, reference sensitivity and EIS spherical coverage standards may be proposed assuming 16 antenna elements and 2 panels (16 antenna elements per panel) implementation.

A general handheld-network operation for this may be as follows.

The UE may inform the network that the UE itself is an FR2-2 handheld UE.

The UE may satisfy the FR2-2 handheld UE Rx RF requirement.

The network may set parameters so that the FR2-2 handheld UE can operate normally.

The UE may perform communication with the network and mobility-related measurement based on the set parameters.

FIG. 8 shows a procedure of a UE according to the disclosure of the present specification.

1. The UE may receive a downlink signal from the base station.

The downlink signal may be received with a channel bandwidth of 400 MHz.

The downlink signal may be received via n263 frequency band.

The UE may be a power class 3 UE.

The transceiver may satisfy radio frequency (RF) requirements.

The RF RF requirement includes at least one of REFSENS (Reference Sensitivity) and EIS (Effective Isotropic Sensitivity) spherical coverage The REFSENS may be −72 dBm.

The EIS spherical coverage may be EIS value at 50 percentile of CCDF (complementary cumulative distribution function).

The EIS spherical coverage may be −60.2 dBm.

The UE may include 8 antennas.

The n263 frequency band may be 57000 MHz or more and 71000 MHz or less.

Hereinafter, a processor for performing communication in a wireless communication system according to some embodiments of the present specification will be described.

The processor receives a downlink signal, wherein the downlink signal is received with channel bandwidth of 400 MHz, wherein the downlink signal is received via n263 frequency band, wherein the UE is power class 3 UE, wherein the transceiver is configured to satisfy a Radio Frequency (RF) requirement, wherein the RF requirement includes at least one of REFSENS (Reference Sensitivity) and EIS (Effective Isotropic Sensitivity) spherical coverage.

Hereinafter, a non-volatile computer-readable medium storing one or more instructions for providing a multicast service in a wireless communication system according to some embodiments of the present specification will be described.

According to some embodiments of the present disclosure, the technical features of the present disclosure may be directly implemented as hardware, software executed by a processor, or a combination of the two. For example, in wireless communication, a method performed by a wireless device may be implemented in hardware, software, firmware, or any combination thereof. For example, the software may reside in RAM memory, flash memory, ROM memory, EPROM memory, EEPROM memory, registers, hard disk, removable disk, CD-ROM, or other storage medium.

Some examples of a storage medium are coupled to the processor such that the processor can read information from the storage medium. Alternatively, the storage medium may be integrated into the processor. The processor and storage medium may reside in the ASIC. For another example, a processor and a storage medium may reside as separate components.

Computer-readable media can include tangible and non-volatile computer-readable storage media.

For example, non-volatile computer-readable media may include random access memory (RAM), such as synchronization dynamic random access memory (SDRAM), read-only memory (ROM), or non-volatile random access memory (NVRAM). Read-only memory (EEPROM), flash memory, magnetic or optical data storage media, or other media that can be used to store instructions or data structures or Non-volatile computer readable media may also include combinations of the above.

Further, the methods described herein may be realized at least in part by computer-readable communication media that carry or carry code in the form of instructions or data structures and that can be accessed, read, and/or executed by a computer.

According to some embodiments of the present disclosure, a non-transitory computer-readable medium has one or more instructions stored thereon. The stored one or more instructions may be executed by a processor of the base station.

The stored one or more instructions cause the processors to receive a downlink signal, wherein the downlink signal is received with channel bandwidth of 400 MHz, wherein the downlink signal is received via n263 frequency band, wherein the UE is power class 3 UE, wherein the transceiver is configured to satisfy a Radio Frequency (RF) requirement, wherein the RF requirement includes at least one of REFSENS (Reference Sensitivity) and EIS (Effective Isotropic Sensitivity) spherical coverage.

The present specification may have various effects.

For example, by proposing a standard specification for a handheld UE supporting the n263 band, communication between the network and the UE can be guaranteed and commercialized.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method. Other implementations are within the scope of the following claims.

What is claimed is:

1. A UE (User Equipment), comprising:
 a transceiver; and
 a processor,
 wherein the transceiver receives a downlink signal,
 wherein the UE is power class 3 UE,
 wherein the number of antenna panels of the UE is 1 or 2,
 wherein the downlink signal is via a frequency between 57 GHz and 71 GHz,
 wherein the downlink signal is based on QPSK (Quadrature Phase Shift Keying) modulation,
 wherein roll-off loss of the antenna panel or panels of the UE is 2.5 dB, based on the frequency between 57 GHz and 71 GHZ,
 wherein total loss of the UE is 10 dB, based on the roll-off loss,
 wherein the transceiver is configured to satisfy a Radio Frequency (RF) requirement,
 wherein the RF requirement includes at least one of REFSENS (Reference Sensitivity) and EIS (Effective Isotropic Sensitivity) spherical coverage, and
 wherein the REFSENS is −72 dBm, based on the total loss of the UE being 10 dB, a channel bandwidth being 400 MHz and an operating band being n263.

2. The UE of claim 1,
 wherein the EIS spherical coverage is EIS value at 50 percentile of CCDF (complementary cumulative distribution function),
 wherein EIS spherical coverage is −60.2 dBm.

3. The UE of claim 1,
 wherein the UE includes 8 antennas.

4. The UE of claim 1,
 wherein the n263 operating band is a frequency band between 57000 MHz and 71000 MHz.

5. A method, comprising:
 receiving, by a UE (User Equipment), a downlink signal,
 wherein the UE is power class 3 UE,
 wherein the number of antenna panels of the UE is 1 or 2,
 wherein the downlink signal is via a frequency between 57 GHz and 71 GHZ,
 wherein the downlink signal is based on QPSK (Quadrature Phase Shift Keying) modulation,
 wherein roll-off loss of the antenna panel or panels of the UE is 2.5 dB, based on the frequency between 57 GHz and 71 GHZ,
 wherein total loss of the UE is 10 dB, based on the roll-off loss,
 wherein the UE is configured to satisfy a Radio Frequency (RF) requirement,
 wherein the RF requirement includes at least one of REFSENS (Reference Sensitivity) and EIS (Effective Isotropic Sensitivity) spherical coverage,
 wherein the REFSENS is −72 dBm, based on the total loss of the UE being 10 dB, a channel bandwidth being 400 MHz and an operating band being n263.

6. The method of claim 5,
 wherein the EIS spherical coverage is EIS value at 50 percentile of CCDF (complementary cumulative distribution function), AND
 wherein EIS spherical coverage is −60.2 dBm.

7. The method of claim 5,
wherein the UE includes 8 antennas.

8. The method of claim 5,
wherein the n263 operating band is a frequency band between 57000 MHz and 71000 MHz.

9. An apparatus in mobile communication, the apparatus comprising:
at least one processor; and
at least one memory storing instructions and operably electrically connectable with the at least one processor;
wherein, based on the instructions performed by the at least one processor, operation includes:
receiving a downlink signal,
wherein the apparatus is power class 3 UE,
wherein the number of antenna panels of the apparatus is 1 or 2,
wherein the downlink signal is via a frequency between 57 GHz and 71 GHZ,
wherein the downlink signal is based on QPSK (Quadrature Phase Shift Keying) modulation,
wherein roll-off loss of the antenna panel or panels of the UE is 2.5 dB, based on the frequency between 57 GHz and 71 GHZ,
wherein total loss of the UE is 10 dB, based on the roll-off loss,
wherein the apparatus is configured to satisfy a Radio Frequency (RF) requirement,
wherein the RF requirement includes at least one of REFSENS (Reference Sensitivity) and EIS (Effective Isotropic Sensitivity) spherical coverage,
wherein the REFSENS is −72 dBm, based on the total loss of the UE being 10 dB, a channel bandwidth being 400 MHz and an operating band being n263.

* * * * *